E. A. HOLMES.
AUTOGRAPHIC REGISTER.
APPLICATION FILED OCT. 11, 1915.
1,204,571.
Patented Nov. 14, 1916.
3 SHEETS—SHEET 2.
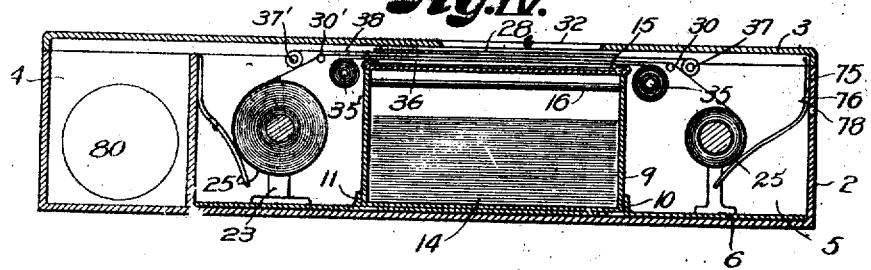
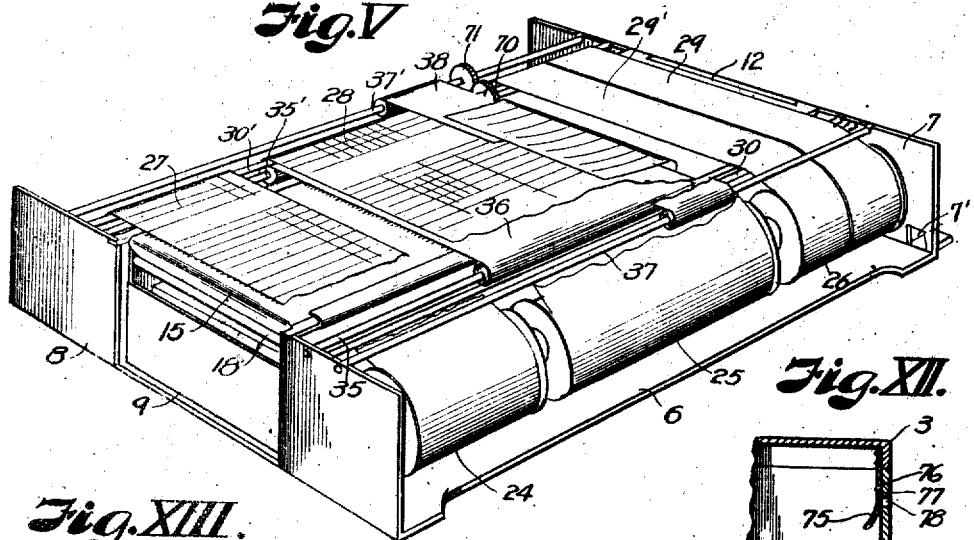
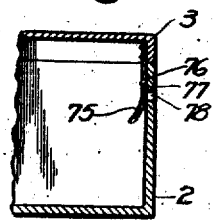
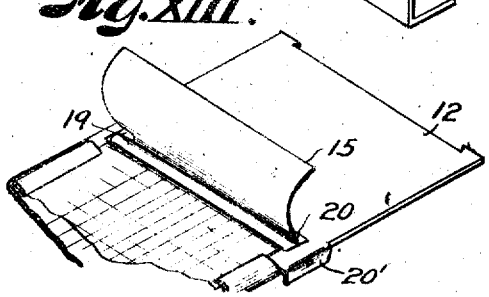
INVENTOR
Edgar A. Holmes.
BY
Arthur C. Brown
ATTORNEY

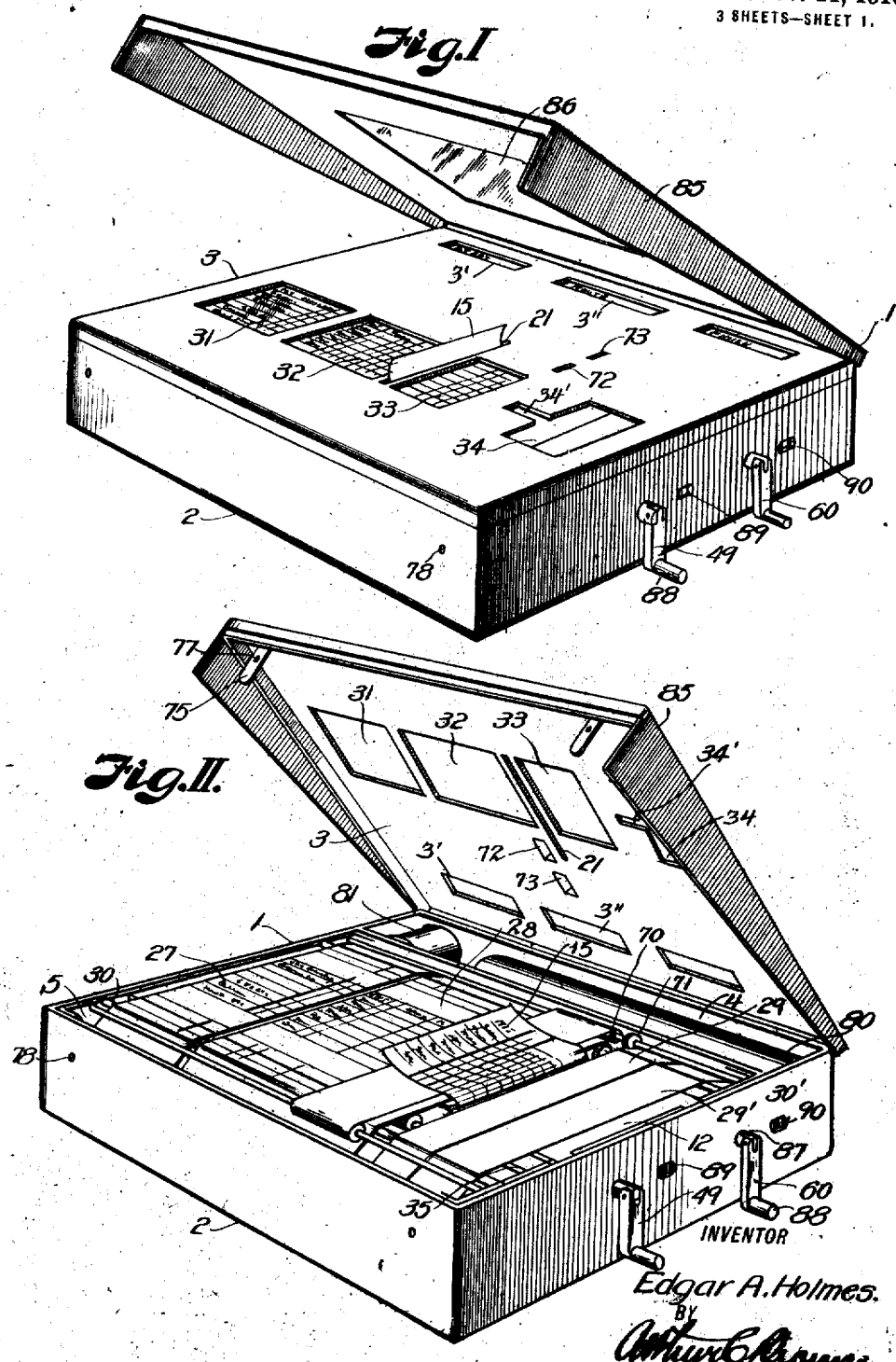

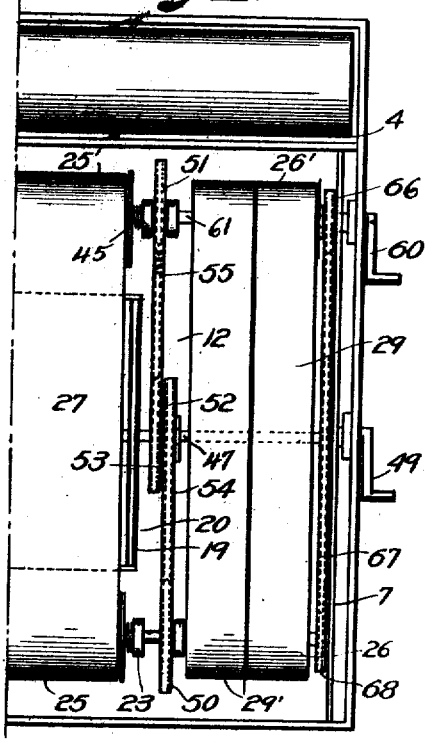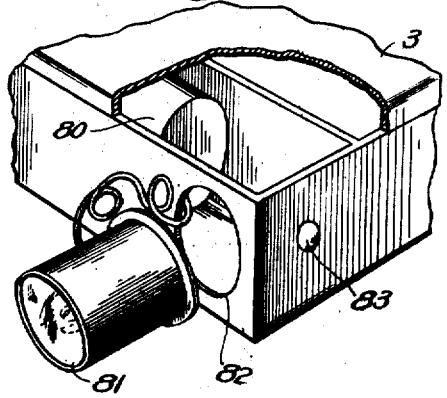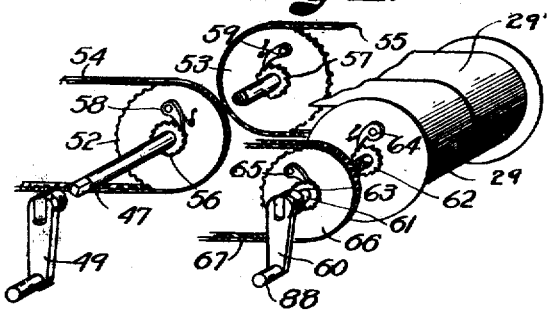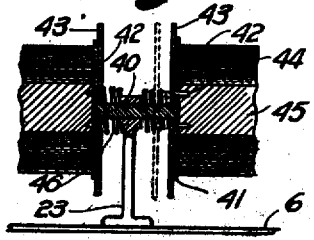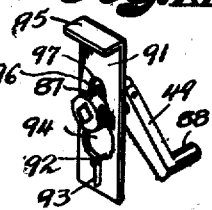

UNITED STATES PATENT OFFICE.

EDGAR A. HOLMES, OF KANSAS CITY, KANSAS.

AUTOGRAPHIC REGISTER.

1,204,571.  Specification of Letters Patent.  Patented Nov. 14, 1916.

Application filed October 11, 1915. Serial No. 55,194.

*To all whom it may concern:*

Be it known that I, EDGAR A. HOLMES, a citizen of the United States, residing at Kansas City, in the county of Wyandotte and State of Kansas, have invented certain new and useful Improvements in Autographic Registers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to autographic registers, and more particularly to a device of this character for use by water, light or gas companies in making records of the monthly meter readings, flat rate inspections or any other demands of like nature, and wherein a plurality of record rolls are utilized to preserve a record of the account and to deliver duplicates of the record for a customer and a stub for a cashier or recorder's reference. It is common practice with such companies to make monthly readings of all their meters and to prepare a statement for each customer based on the reading of their meter. The preparing of such statements and recording of their account comprises, first—a reading of the meters, second, the transfering of such readings from the meter reader's book to the office ledger, and, third, the preparing of statements for the customers from the ledger data and the mailing of the statement to the customer.

It is the object of the present invention to provide means whereby the ledger account, the customer's statement and cashier's stub may all be recorded at the time of the meter reading and whereby the account is kept in a more systematic and simpler way and at a smaller cost.

It is a further object of the invention to provide mechanism whereby the record webs may be wound or unwound from one roll to another without allowing the web to become slack or uneven, and a simple means for supporting the said rolls so that they may be easily and quickly removed.

In accomplishing these objects I have provided the improved details of structure hereinafter described and illustrated in the accompanying drawings, wherein:—

Figure I is a perspective view of a register constructed according to my invention. Fig. II is a similar view of the register with the interior top covering raised to better illustrate the mounting of the record rolls. Fig. III is a central longitudinal section of the register. Fig. IV is a central cross-section of the same. Fig. V is a detail perspective view of the operative parts of the machine and their mounting. Fig. VI is a partial plan view of the device, showing the roll winding mechanism. Fig. VII is a sectional view of one set of record rolls, particularly showing their interlocking means and winding mechanism. Fig. VIII is an enlarged section of one of the roll locking members. Fig. IX is a perspective view of a portion of the box, showing the lighting members. Fig. X is a perspective view of the winding mechanism, parts being shown in spaced relation for better illustration. Fig. XI is a detail perspective of the winding crank locking mechanism. Fig. XII is a detail view of the lid latch. Fig. XIII is a perspective view of a portion of the writing plate, showing the roller mounted therein.

Referring more in detail to the drawings, 1 designates the register as a whole, which comprises a roll housing 2, preferably formed of wood or a light metal so that it may be both substantial and of light weight, and which is provided with a hinged covering or lid 3. The housing is preferably divided into two compartments: the smaller compartment 4 containing the lighting members later described, and the larger compartment 5 being adapted for containing the record rolls and winding mechanism.

The lid 3 is preferably provided with pockets 3' for containing slips 3" bearing a record of the time when a meter reader starts on his route, the number of the route, and the time he finishes the route.

Removably contained within the compartment 5 is a secondary base plate 6 having upturned end faces 7—8; the said base being of such size that it will fit snugly within the housing 2 and support the record and carbon rolls, later more fully described, so that they may be removed from the housing to facilitate the removal or replacing of the record rolls.

In order to accommodate other parts of the machine, presently described, I set the end plate 7 in from the adjacent end of the housing and stamp lips 7' therefrom which are bent down into alinement with the base plate 6 and engage the end of the housing to brace the base plate and prevent longitudinal movement thereof.

Mounted on the base 6 longitudinally therewith, and near the center thereof, is a bill container 9 which comprises a box-like receptacle slidably mounted within the housing so that it may be removed therefrom when it is to be filled and is held in position within the housing by ears 10—11 that are upturned from the base 6.

Overlying the container 9 is a writing plate 12 which extends the length of the housing and is supported by the base end members 7—8 and which is used as a support for the record webs presently described.

Within the housing 9 is a bill stack 14 which comprises a continuous web 15 that is folded to form a compact pile and has its end threaded over a cross roller 16 near the closed end of the container and drawn forwardly between rollers 17—18 at the open end of the container and then back over the cover plate 12 beneath a cross roller 19 that is mounted below a slot 20 in the plate 12 between ears 20' formed integral with the cover plate, thence back to overlie a part thereof and finally outwardly through a slot 21 in the top covering 3.

Revolubly mounted at each side of the container 9, parallel therewith and supported by the end members 7—8 and intermediate standards 23, are paired record rolls 24—24', 25—25' and 26—26'; the webs 27, 28, and 29—29' respectively or each pair being drawn over guide rods 30—30' that are seated on the end plates 7—8 and across the plate 12, and the covering 3 being provided with cut-out openings 31, 32, 33 and 34 to expose the webs so that a record may be written thereon, the opening 34 exposing the web 29' and having a restricted extension 34' exposing part of the web 29.

Journaled in the end members 7—8 and extending parallel with the record rolls are shafts 35—35', which carry a carbon paper web 36 that is drawn beneath the record web 28 and overlies the web 15 that is drawn from the container 9, and mounted in a similar manner on cross shafts 37—37' is a carbon paper web 38 which is narrower than the web 35, and is so placed as to overlie a part of the record web 28 and underlie the back turned portion of the web 15 between the slot 21 and roller 19.

By so placing the record rolls and carbons it will be seen that a record written on that portion of the web 28 exposed by the opening 32 will be reproduced on the web 15 and a record written on the exposed portion of the web 15 through the opening 33 will be reproduced on the web 28 and again on the web 15. The web 29 in this instance is not used in the recording of data but preferably carries a rate list, and the web 29' is preferably blank and may be used as a place for figuring or for recording notes, the said webs 29—29' being operated independently of the remaining webs, as will be later described.

In order that the readings may be properly recorded it is necessary that the webs 27 and 28 be at all times positioned relative to each other, and to keep them in such positions it is necessary that the rolls be turned synchronously, and to provide means for interlocking the rollers when in use and at the same time means whereby a roll may be removed from the frame without the necessity of removing the others, I have provided the standards 23 between the said rolls with a revoluble stub shaft 40, having at its ends disks 41 provided near their centers with apertures 42, and slidably mounted on that portion of the shaft between the disks 41 and standards 23 are somewhat larger disks 43, carrying pins 44 that are projected outwardly through the disks 41 and adapted for projection into sockets in the ends of wooden cores 45 on which the web rolls are wound; the said disks 43 being urged outwardly to clamp the roll by springs 46 that are coiled about the shaft 40 and bear against the standard 23 and disks 43.

To remove the rolls from their supports it is only necessary to draw the disks 43 outwardly against the pressure of the springs 46, to withdraw the pins 44 carried thereby from the roller cores 45 and permit removal of the roll.

In order that the webs may be wound from one roll to an opposite roll to draw the same beneath the cover openings, I provide a winding mechanism which comprises a central winding shaft 47 revolubly mounted in a supporting plate 48 and the end plate 7, and provided with a winding crank 49.

Freely mounted on the shaft 47 in alinement with sprocket wheels 50—51, that are secured on the axles 45 of rolls 25 and 25' respectively, are sprockets 52 and 53; the sprockets 50 and 52 and sprockets 51 and 53 being connected respectively by chain belts 54 and 55.

Rigidly secured on the shaft 47 and adapted to turn therewith, are ratchet wheels 56 and 57, the teeth of one ratchet being set opposite to those of the other; and pivotally mounted on the faces of the sprocket wheels 52 and 53 are oppositely set pawls 58 and 59 which respectively engage the teeth of the ratchets 56 and 57, so that by revolving the shaft 47 in one direction one of the pawls will act to draw the web in a like direction, but on revolving the shaft in the opposite direction the first pawl will be released and the second pawl will act, thus drawing the web in the opposite direction.

The winding of the web 29—29' is accomplished in a similar manner by means of a crank 60 carried at the outer end of a winding shaft 61 which is supported by a standard 23 and end plate 7 and revolubly carries a roll axle 45.

Secured on the shaft 61 are ratchets 62 and 63 which are engaged by oppositely mounted pawls 64 and 65 that are respectively mounted on the end disk of the roll 26, and a sprocket wheel 66 revolubly mounted on the shaft 61 between the ratchets 62 and 63. The sprocket wheel 66 carries a chain-belt 67 which runs over a similar sprocket wheel 68 secured on the opposite roll core, so that by turning the crank 60 in one direction the web will be drawn likewise but on reversing the direction of winding, the direction of the web will be likewise reversed, because of the opposite arrangement of the ratchets on the winding shaft.

In order that the carbon may be shifted when necessary I provide the shafts 35' and 37', on which the carbon webs are mounted, with knurled nuts 70 and 71, and directly above said nuts I provide the cover 3 with slots 72 and 73 so that when it is desired to shift the carbon webs, a pointed tool, or a lead pencil point, may be projected through the slot to engage the knurled surface of the nut beneath, and the latter may be revolved to wind the carbon.

As a means for locking the covering, I provide spring members 75, which are fastened to the cover 3, and provide the housing member with latches 76 adapted for projection within apertures 77 in the said spring members when the lid is brought to a closed position; the latches being released to unlock the parts by means of a pointed tool or pencil point which may be projected through apertures 78 in the housing to engage the latch members 75 so that they may be pressed outwardly out of engagement with the pins 76, which will permit the cover to be raised.

As it is the usual practice to place meters in basements or pits, so that a light is necessary to read the figures thereon, I provide the device with lighting means comprising a battery 80 which is carried in the compartment 4, and a bulb and reflector 81 which fits snugly in a socket 82 in the end of the housing 2 but which may be withdrawn therefrom if desired and carried in the hand, so that on pressing a button 83 to close a circuit therethrough, light may be thrown on the writing surface of the register, or on the meter, as desired. I also provide the housing with a covering 85 which may be made of a thin metal and hinged or hooked to the cover 3, and is adapted to cover the writing openings therein to prevent injury to the record webs while handling the device, or possible damage thereto in stormy weather; the cover 85 also being provided with a transparent center plate 86.

In order to make the device more compact for storing, and to lock the rolls against rotation, I have pivoted the crank arms 49—60 to their head members 87 so that they may be hinged back and the crank handles 88 projected within the housing through apertures 89—90.

In order that the handles 49 and 60 may be entirely removed from the device I preferably provide each with the head 87, having a socket 89 that is adapted to receive the squared end 90 of its shaft, so that when the head is in place the shaft will turn with the handle, but may be removed therefrom by pulling outwardly on the handle. To hold the handle in functional position, I mount a slide 91 on the inner face of the housing end wall, preferably by a pin 92 on the end wall and a slot 93 on the slide, and provide the slide with an aperture 94 through which the head 87 may be projected, and with an end lip 95 whereby it may be manipulated. The head 87 has a peripheral groove 96 and the slide a slot 97 opening to the aperture 94 so that when the slide is moved downwardly the slotted part will take into the peripheral groove in the handle head, to hold the handle against displacement without interferring with its rotary movement, but when it is lifted will permit the withdrawal of the head through the aperture 94.

Presuming the parts to be so constructed and assembled, the web 15, being properly printed, perforated and folded, is placed within the container and threaded over the cover plate 12, as previously described. After properly placing the web 15 the carbon paper web 36 and record webs 24 and 25 are drawn thereover. The carbon paper roll 38 is then placed beneath the back turned end of the web 15 and the register is ready for use.

In preparing the record webs it is best to have the first web roll printed to contain the records of a plurality of meters. The meter record comprising—the location, owner, owner's address, license number, number of meter, size of meter, and its location. This record web after being once filled out is permanent, and need not be removed from the register except when necessary to make some correction thereon.

The second record web is adapted for containing the monthly readings of the meters entered on the first web and comprises a primary portion bearing stated information, such as the names of the months in regular order and secondary section that lies between the members of the web 15 and receive the impression therefrom; the webs being so arranged that the readings entered retain a relative position with each other as the webs are wound back and forth. This second web extends beneath the cover openings 32 and 33 and also contains a column for the monthly charge.

In using the device, the meter reader enters the meter record on the first web, and records the reading and usage through the opening 32 on the record web. Through the opening 33 on the web 15 is entered the charge; this being duplicated on the web 28 and also on the under portion of the web 15. After making a reading the web 15 is drawn out a designated distance and the end stub removed which is kept for the cashier's reference; the remaining portion comprising the customer's bill and is left with the owner at the time the reading is made.

It will be seen that by so constructing the device, a simple and systematic means is provided for keeping a record of the meter readings and customers' accounts all of which is done practically at one writing. It is also seen that a bill may be delivered to the customer at the time the meter is read, thereby saving work previously done in the office in preparing individual statements and the expense of mailing the same, and, furthermore, all mistakes that are apt to occur in copying or transferring readings from one book to another are avoided, as the record web is intended to take the place of the present ledger and the figures thereon need not be transferred.

It is further noted that by this method of keeping the accounts the number of employees necessary to carry on the office work is very small as compared with the number employed where present methods are used.

Having thus described my invention, what I claim as new therein, and desire to secure by Letters-Patent, is:—

1. The combination with a record web, of means for advancing the record web to successively locate separate sections thereof in functional position, a separate web having portions located beneath and over the record web, transfer media located between each portion of the separate web and the record web, whereby an impression on the upper portion of the separate web may be transferred to the record web and to the under portion of the separate web, and a cover for the webs, having openings therein through which records may be made on the webs.

2. The combination with a record web, of means for advancing the web to successively locate separate sections thereof in functional position, means at opposite sides of the record web for holding carbon paper, means for guiding a separate web beneath and over the record web and a cover having openings therein through which access may be had to such web, and having a slot through which a separate web may be withdrawn.

3. The combination with a record web, of means for advancing the record web to successively locate separate sections thereof in functional position, a separate web having portions located beneath and over the record web, and means at opposite sides of the record web for holding transfer media between the record web and the upper and lower portions of the separate web.

4. The combination with a record web comprising primary and secondary sections, of means for guiding a separate web over the secondary section of the record web, means for actuating the record web, and means for holding a carbon sheet between a separate web and the secondary section of the record web.

5. The combination with a housing, of a record web, a separate web extending transversely of and beneath the record web throughout the entire width of the latter and above a fractional part thereof, means for shifting the record web, and means for holding carbon sheets between opposite faces of the record web and the upper and lower portions of the separate web.

6. The combination with a record web, of means for guiding a separate web beneath the record web and above a portion thereof, transfer media on opposite sides of the record web, means for advancing the record web, and means for shifting the transfer media.

7. The combination with separate meter record and meter reading webs, of means for advancing said webs synchronously, and a separate web located beneath the meter record and meter reading webs and having a portion extended over the meter reading web.

8. An autographic register comprising independent meter record and meter reading webs, means for advancing said webs synchronously, a separate web extended beneath both of the webs and over a portion of the meter reading web, and transfer media located between the meter reading web and the separate web, and between the overlying portion of the separate web and the underlying part of the meter reading web.

9. An autographic register comprising a record web, a rate web, a separate web located beneath and transversely of the record web, means for advancing the record web, and means for advancing the rate web independently of the record web and of the separate web.

10. An autographic register comprising a record web, a rate web, separate means for actuating the record and rate webs, a separate web located beneath and transversely of the record and rate webs and beneath the record web, and transfer media located between the record web and the separate web.

11. An autographic register comprising a record web and an independent rate web, means for guiding a separate web beneath and above a portion of the record web, carbon sheets between the record web and the under and over portions of the separate web, and means for moving the record web.

12. The combination with a housing, of a table located within the housing, means located beneath the table for containing a web, means for guiding said web longitudinally over the table, a permanent record web and a monthly record web extending transversely over the table above the first named web and in juxtaposition thereto whereby records on both of said webs may be read in relation to each other, means for guiding the first named web back over a portion of the monthly record web, transfer media between the monthly record and the first named web, and means for advancing the monthly record web.

13. The combination with a housing, of a web within the housing, and a cover for the housing having individual openings for exposing individual webs and having a slot between two of the openings through which one of the webs may be withdrawn.

14. The combination with a housing, of webs within the housing, and a cover having individual openings for exposing individual webs and having a slot between two of the openings, one of said openings having a relatively narrow extension for exposing a web adjacent the web that is exposed by the main portion of the opening.

15. The combination with a housing, of webs within the housing, and a cover for the housing having individual openings for exposing individual webs and having a slot between two of the openings, one of said openings being adapted for exposing a web and having a relatively narrow extension for exposing an adjacent web.

16. An autographic register comprising a pair of spaced cores, a second pair of cores arranged in spaced relation and in alinement with cores in the first pair, releasable connection between the alining cores, and means for rotating the spaced cores, whereby webs carried thereby may be wound in a desired direction.

17. In an autographic register, the combination with a housing, of a pair of spaced rolls, a web on said rolls bearing customers' names, a second pair of spaced rolls, a web on said second pair of rolls bearing date designations and entry spaces, and means for moving said pairs of rolls synchronously to progressively display relative portions of the webs.

18. In an autographic register, a writing plate, a container for housing a folded web, which may be drawn therefrom across said writing plate, shafts supported at opposite sides of said container for carrying record webs which may be drawn across said writing plate and across a web leading from the container, sprocket wheels rigidly secured to said shafts, a winding shaft, sprocket wheels revolubly mounted on said winding shaft and paired with said shaft sprocket wheels, chains connecting said paired sprocket wheels, and means for locking said winding shaft sprocket wheels with said shaft, so that one may revolve therewith in one direction, but will be free thereon when the direction of the shaft is reversed.

19. In an autographic register, a plurality of paired shafts for carrying record webs, sprocket wheels fixed on said shafts, a winding mechanism comprising a winding shaft, sprocket wheels revolubly mounted on said shaft and paired with the sprocket wheels on the web carrying shaft, chain belts running over said paired sprocket wheels, oppositely operating ratchet wheels secured on said winding shaft adjacent said sprocket wheels, pawls pivotally mounted on said sprocket wheels and adapted to engage said ratchet wheels, and a crank on said winding shaft.

20. An autographic register comprising a housing having a plurality of writing openings in its cover member and having a slot between two of said openings, a removable base within said housing having upturned end members, a writing table supported on said end members, having a slot thereacross, a roller mounted beneath said writing table slot, a container removably mounted on said base beneath said writing table and adapted for containing a folded web which may be drawn therefrom to overlie said writing table, projected through said slot and beneath said roller and drawn back on itself and projected outwardly through said cover slot, standards mounted on said base, shafts revolubly supported by said standards, web rolls at opposite sides of said writing plate, a record web carried by said shafts and extending across the table, other paired shafts at the sides of the table, a carbon web carried by said other shafts and extending across the table, under the record web and over the container web, a third pair of shafts at opposite sides of the table, a relatively narrow carbon paper web carried by said third shafts and overlying a portion of the record web and underlying the back-turned end of the container web, means for shifting the carbon webs, and means for winding the record web from one of its shafts to its opposite shaft, for the purpose set forth.

In testimony whereof I affix my signature.

EDGAR A. HOLMES.